United States Patent
Wiatrowski et al.

(10) Patent No.: US 8,102,857 B2
(45) Date of Patent: Jan. 24, 2012

(54) SYSTEM AND METHOD FOR PROCESSING DATA AND CONTROL MESSAGES IN A COMMUNICATION SYSTEM

(75) Inventors: David G. Wiatrowski, Woodstock, IL (US); Donald G. Newberg, Hoffman Estates, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 756 days.

(21) Appl. No.: 11/670,514

(22) Filed: Feb. 2, 2007

(65) Prior Publication Data

US 2008/0186943 A1    Aug. 7, 2008

(51) Int. Cl.
  *H04L 12/28*    (2006.01)
(52) U.S. Cl. ........ 370/394; 370/474; 370/328; 370/496; 370/522; 455/466
(58) Field of Classification Search .................. 455/466; 370/328, 347, 394, 349, 474, 496, 522
See application file for complete search history.

(56) References Cited

U.S. PATENT DOCUMENTS

| | | | |
|---|---|---|---|
| 5,652,783 A * | 7/1997 | Keba et al. ..................... | 370/313 |
| 6,920,331 B1 * | 7/2005 | Sim et al. ....................... | 455/466 |
| 7,061,910 B2 * | 6/2006 | Beshai ........................... | 370/392 |
| 7,339,917 B2 * | 3/2008 | Newberg et al. .............. | 370/345 |
| 7,489,647 B2 * | 2/2009 | Shin ............................... | 370/310 |
| 2002/0126675 A1 * | 9/2002 | Yoshimura et al. ....... | 370/395.21 |
| 2004/0240465 A1 * | 12/2004 | Newberg et al. .............. | 370/442 |
| 2005/0044264 A1 | 2/2005 | Grimminger et al. | |
| 2005/0163474 A1 * | 7/2005 | Himeno et al. ................. | 386/52 |
| 2006/0083229 A1 | 4/2006 | Jordan | |
| 2006/0184874 A1 * | 8/2006 | Kimiya ......................... | 715/513 |
| 2008/0049711 A1 | 2/2008 | Desai | |

FOREIGN PATENT DOCUMENTS

KR    200683751 A    7/2006

(Continued)

OTHER PUBLICATIONS

ETSI TS 102 361-1, V1.2.1 (Jan. 2006), Electromagnetic compatibility and Radio spectrum Matters (ERM); Digital Mobile Radio (DMR) Systems; Part I: DMR Air Interface (AI) Protocol.*

(Continued)

*Primary Examiner* — Jinsong Hu
*Assistant Examiner* — Qun Shen
(74) *Attorney, Agent, or Firm* — Terri Hughes Smith; Valerie M. Davis (57) ABSTRACT

A system and method for receiving data and control messages comprised of a series of data units is provided. The data units comprising each message are structured to follow a particular sequence, such as zero or more data units of a first type followed by one or more data units of a second type, which may then followed by data units of one or more other predetermined types. Upon receiving a data unit of a first or second type, a number of "units to follow" is determined from information provided in the received data unit. A number of subsequently received data units are then forced to be processed as one of the first type, the second type, or other predetermined type in accordance with the known structure of the message. The number of subsequently received data units that are forced to be processed as one of these types is based on the determined number of units to follow.

24 Claims, 5 Drawing Sheets

FOREIGN PATENT DOCUMENTS

WO    03030582 A3    4/2003

OTHER PUBLICATIONS

Russian Office Action Dated Jul. 14, 2010 for Counterpart Application.

Australian Office Action Dated Jul. 1, 2010 for Counterpart Application.

PCT International Search Report Dated Jun. 9, 2008 for Counterpart Application.

* cited by examiner

SYSTEM AND METHOD FOR PROCESSING DATA AND CONTROL MESSAGES IN A COMMUNICATION SYSTEM

TECHNICAL FIELD OF THE DISCLOSURE

This disclosure relates generally to data communications, and more particularly, to a system and method for processing data and control messages in a communication system.

BACKGROUND OF THE DISCLOSURE

When data and/or control messages are communicated between transmitting and receiving devices in a communication system over a wireless interface, typically some type of error detection and error correction mechanism is used to assist in the decoding of the message at the receiving device to enable further processing. Generally, messages are transmitted as a series of data units, each having a predetermined logical structure and having a plurality of different types of fields for organizing bits in the data unit. One or more of these fields typically contain bits that enable error detection and/or error correction for that field. However, depending on the protocol used, some fields may include error correction bits but not error detection bits or limited error detection bits because of a bit number constraint due to, for instance, bandwidth constraints associated with the physical channels over which the data unit is sent. A resulting limitation is an inability to detect decoding errors in some fields can cause problems related to the further processing of the data unit if there are, in fact, errors that go undetected.

An example of an air interface protocol that has a data unit structure that includes fields having error correction but not error detection is the air interface protocol defined in accordance with the European Telecommunications Standards Institute (ETSI) Technical Specification (TS) 102 361 (hereinafter referred to as "ETSI specification"). A data unit structure identified in this technical specification is a burst, which is defined as the smallest predefined group of continuous bits containing information or signaling. More particularly, described therein is a digital mobile radio (DMR) time division multiple access (TDMA) burst. The DMR TDMA burst includes, for instance, a data type field that identifies the type of data being transmitted in an information field, which is also included in the burst. There are a number of data types mentioned in the technical specification including, e.g., voice link control (LC) header, terminator with LC, control signaling block (CSBK), data header, multi-block control (MBC) header, MBC continuation, rate ½ data continuation, rate ¾ data continuation, etc. Since the data type field is subject to error correction (in this case forward error correction (FEC) which is well known in the art) but not error detection, it may not be possible for a receiver to know whether the error correction on the data type field was successful. Because of this, it may be possible under certain error conditions for some burst types to be identified and/or processed incorrectly. In the case of a multi-burst message, this may result in either the entire message failing and being discarded (for an unconfirmed message) or automatic repeat requests (ARQ) that need to be transacted on the channel (for a confirmed message). Either result is undesirable as the former results in a failed communication attempt while the latter consumes additional bandwidth to manage the repeat requests.

Accordingly, there is a need for a system and method for reliably receiving and processing multi-burst messages even if the data type field for one or more of the bursts in the multi-burst message is not processed correctly.

BRIEF DESCRIPTION OF THE FIGURES

Various embodiment of the disclosure are now described, by way of example only, with reference to the accompanying figures.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions with respect to their corresponding respective areas of inquiry and study except where specific meaning have otherwise been set forth herein.

DETAILED DESCRIPTION OF THE DISCLOSURE

The present disclosure provides a system and method for receiving data and control messages comprised of a series of data units. For purposes of this disclosure, a data unit is defined as a group of continuous bits containing information (data or control) and/or signaling. In accordance with the present disclosure, the data units comprising a data and control message are also structured to follow a particular sequence. For instance, one type of message may be structured to include zero or more data units of a first type followed by one or more data units of a second type, which are then followed by one or more units of a third type. One example of such a message is a MBC message, which is defined by the ETSI specification. As will be discussed in more detail below, each MBC message is structured to include zero or more CSBK preamble bursts followed by a MBC header burst followed by one or more MBC continuation bursts.

In another instance, a message may also be structured to include zero or more data units of a first type, followed by one or more data units of a second type, which are followed by one or more data units of either a third type or a fourth type. One example of such a message is a data message, which is also defined by the ETSI specification. As will be discussed in more detail below, each data message is structured to include zero or more CBSK preamble bursts followed by one or more data header bursts. The data header bursts may then be followed either by one or more rate ½ data continuation bursts, one or more rate ¾ data continuation bursts, or any other type of data continuation bursts now known or later developed by one skilled in the art.

In accordance with the present disclosure, upon receiving a data unit of either the first type or the second type, subsequent received data units are forced to be decoded as one of the types of data units that may comprise the message. For example, if a received data unit is identified to be of a first type, a number of "units to follow" (UTF) is determined from information provided in the first type of data unit, and subsequently received data units are processed as data units of the first type until it is determined that there are no more data units of the first type in the message. Once it is determined that there are no more data units of the first type to be received, subsequently received data units are processed as data units of the second type until it is determined that there are no more data units of the second type in the message.

However, if an initially received data unit is identified to be of a second type (i.e., no data units of the first type were provided in the message or no data units of the first type were properly identified), then a number of UTF is determined from information provided in the second type of data unit. Subsequently received data units are then similarly processed as data units of the second type until it is determined that there are no more data units of the second type in the message.

Upon determining that there are no more data units of the second type to be received, a number of following data units, based on the determined number of UTF, are processed in accordance with the type(s) of data units that may follow the data units of the second type. For example, if the data units of the second type are of a type that can only be followed by data units of a third type (i.e., a MBC header burst that is followed by one or more MBC continuation bursts), the number of following data units may be processed as data units of the third type regardless of the data type actually indicated by the received data unit. However, if data units of the second type can be followed by data units of either a third type or a fourth type (i.e., a data header burst that can be followed by either a rate ½ data continuation burst or a rate ¾ data continuation burst), the number of following data units may be processed as either the third type or the fourth type. In this instance, whether each data unit is processed as a data unit of either the third type or the fourth type may also depend on the data type indicated by each individual received data unit, as well as the number of data units previously processed as being of the third type as compared to the number of data units previously processed as being of the fourth type.

Figure 1:
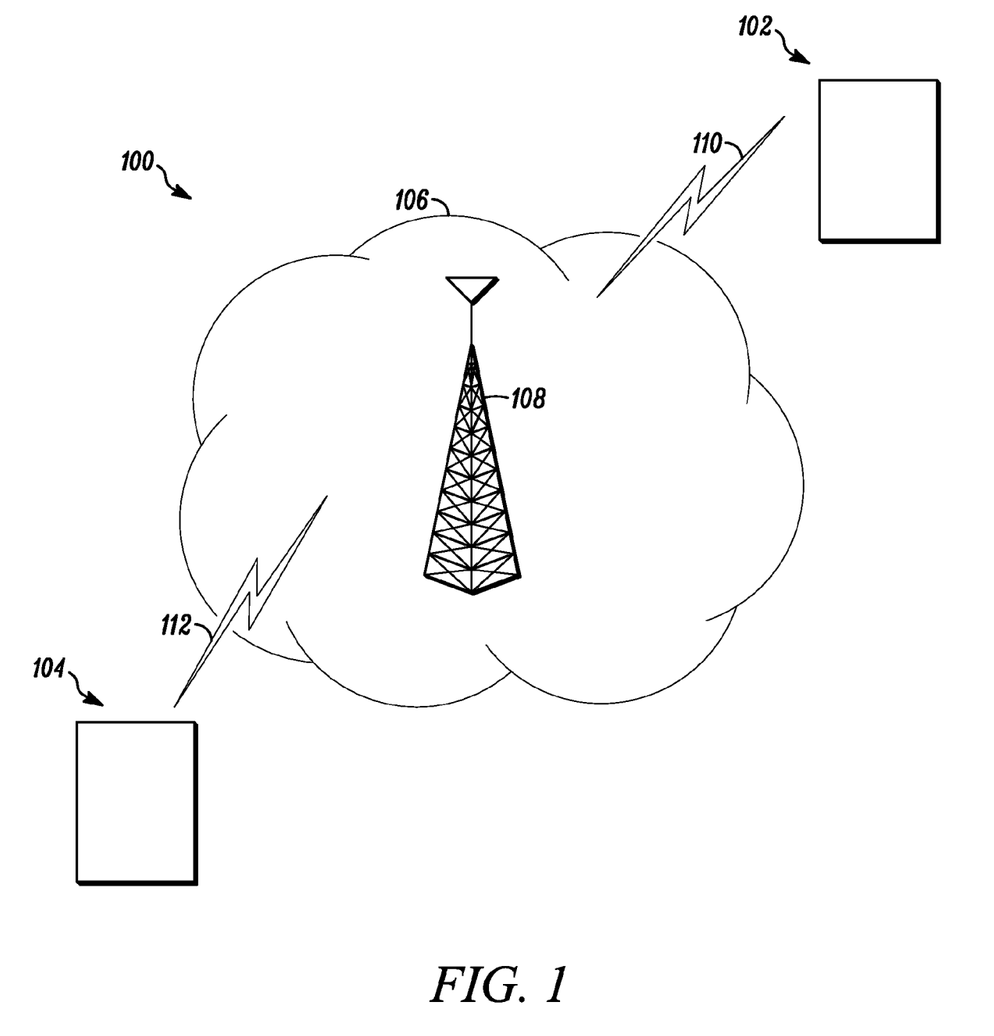
FIG. 1 shows one embodiment of a communication system according to the present disclosure.

Let us now discuss the present disclosure in greater detail by referring to the figures below. FIG. 1 illustrates an exemplary wireless communication system 100 that may be used for implementing the present disclosure. Wireless communication system 100 comprises communication devices 102 and 104, which may be, for example, portable or mobile radios, personal digital assistants, cellular telephones, video terminals, portable computers with a wireless modem, or any other wireless devices. For purposes of the following discussions, the communication devices will be referred to as "radios", but they are also referred to in the art as mobile stations, mobile equipment, handsets, subscribers, etc.

In this exemplary embodiment, radios 102 and 104 communicate over a radio access network 106. Of course, those of ordinary skill in the art will realize that any type of network is within the scope of the teachings herein. Thus, the radio access network 106 may comprise infrastructure such as, but not limited to, base stations (BS) (with a single BS 108 shown for clarity), BS controllers (not shown), network elements (such as a mobile switching center, home location register, visitor location register, etc.), and the like, to facilitate the communications between radios having access to the radio access network 106.

For example, radio 102 and radio 104 may communicate with each other by radio 102 establishing a wireless link or radio connection 110 with BS 108 over an available radio frequency (RF) channel and radio 104 establishing a wireless link 112 with BS 108 over an available RF channel. As is well understood in the art, BS 108 generally comprises one or more repeater devices that can receive a signal from radio 102 over link 110 and retransmit the signal to radio 104 over link 112 or can receive a signal from radio 104 over link 112 and retransmit the signal to radio 102 over link 1 10. For ease of illustration, only two radios and one BS is shown. However, those skilled in the art will realize that in a typical system a much larger number of radios are supported by a radio network, which has many more BSs than is shown in FIG. 1. Moreover, although in this embodiment communication between radios 102 and 104 are illustrated as being facilitated by BS 108, radios 102 and 104 may communicate using a direct mode of operation without a BS. The teachings herein are equally applicable to direct mode operation between two radios.

Since network 106 is a wireless network, meaning that it supports a wireless or air interface protocol for signal transmission, both of the radios 102 and 104 and BS 108 comprise transceiver devices that include transmitter and receiver apparatus for, respectively, transmitting and receiving RF signals. Radios 102 and 104 and BS 108 further comprise one or more processing devices (such as microprocessors, digital signal processors, customized processors, field programmable gate arrays (FPGAs), unique stored program instructions (including both software and firmware), state machines, etc.) and typically some type of conventional memory element for performing (among other functionality) the air interface protocol and channel access scheme supported by network 106. Using these protocols, radios 102 and 104 can generate RF signals containing one or more data messages comprising a plurality of fields for organizing the continuous bits of information and/or signaling for transmission to another radio.

Of course, while one embodiment of a communication system 100 is described with regards to FIG. 1, those skilled in the art will recognize and appreciate that the specifics of this illustrative example are not specifics of the invention itself and that the teachings set forth herein are applicable in a variety of alternative settings. For example, since the teachings described do not depend on the type of air interface protocol or channel access scheme used (e.g., TDMA, code division multiple access (CDMA), frequency division multiple access (FDMA), and the like), the teachings can be applied to any type of air interface protocol and channel access scheme, although the air interface protocol (for a DMR using a TDMA channel access scheme) as defined in ETSI TS 102 361 is described in embodiments herein. The teachings herein can also be applied with any system and with any protocol utilizing wireline links. As such, other alternative implementations of using different types of wireline or wireless protocols and channel access schemes are contemplated and are within the scope of the various teachings described.

Figure 2:
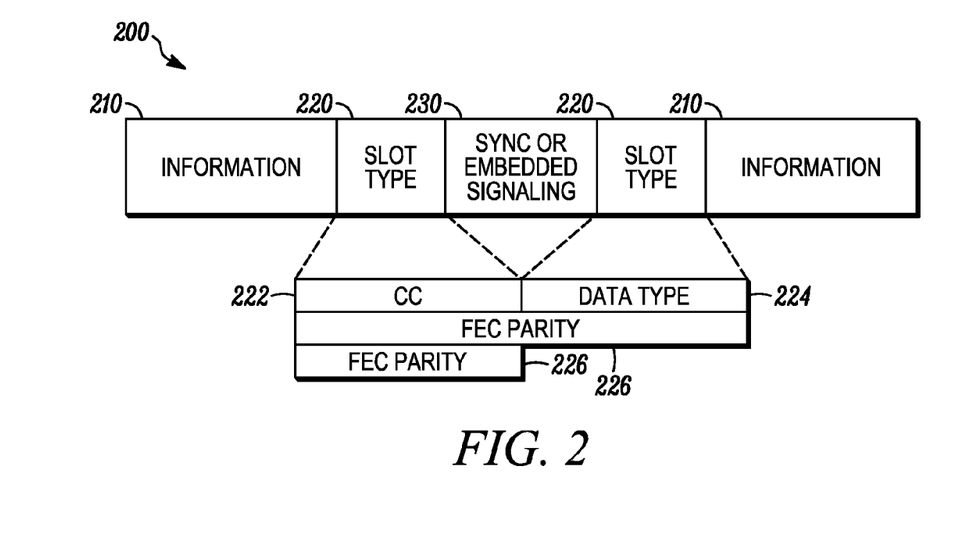
FIG. 2 shows one embodiment of a TDMA burst in accordance with the present disclosure.

FIG. 2 illustrates one exemplary embodiment of a single data unit that may be used for transmitting information and/or signaling between radios 102 and 104 and BS 108. In this embodiment, the data unit is a TDMA burst in accordance with ETSI TS 102 361-1. As shown in FIG. 2, the TDMA burst 200 comprises an information field 210 containing 196 bits of information. The information field 210 includes FEC encoded information specific to the type of burst being transmitted (e.g., voice LC header, terminator with LC, CSBK, data header, MBC header, MBC continuation, rate ½ data continuation, rate ¾ data continuation, etc.). The TDMA data burst also includes a slot type field 220 having information that defines the meaning of the information field 210. The slot type field 220 comprises a color code (CC) field 222, a data type field 224, and FEC parity 226. The center of the TDMA data burst also includes a synchronization pattern or embedded signaling information field 230.

In addition to defining an individual TDMA burst structure, the ETSI specification also defines various multi-burst messages. For the sake of clarity, the present disclosure will be described with regards to two exemplary message structures defined by the ETSI specification. However, it should be understood that the present disclosure may also be used with many other types of messages, whether defined by the ETSI specification or another other specification.

Figure 3:
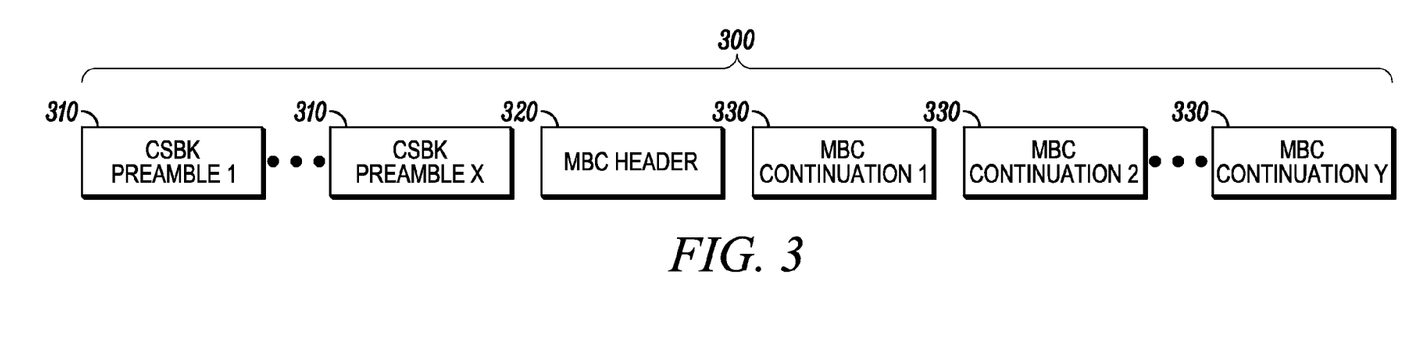
FIG. 3 shows one embodiment of a multi-burst control message in accordance with the present disclosure.

One example of a multi-burst message defined by the ETSI specification is a MBC message. As shown in FIG. 3, the MBC message comprises a MBC header burst 320 that is always followed by a Y number of MBC continuation bursts 330, where Y is greater than or equal to 1. The MBC header 320 may also be preceded by an X number of preamble CSBK bursts, where X is greater than or equal to 0.

Figure 4:
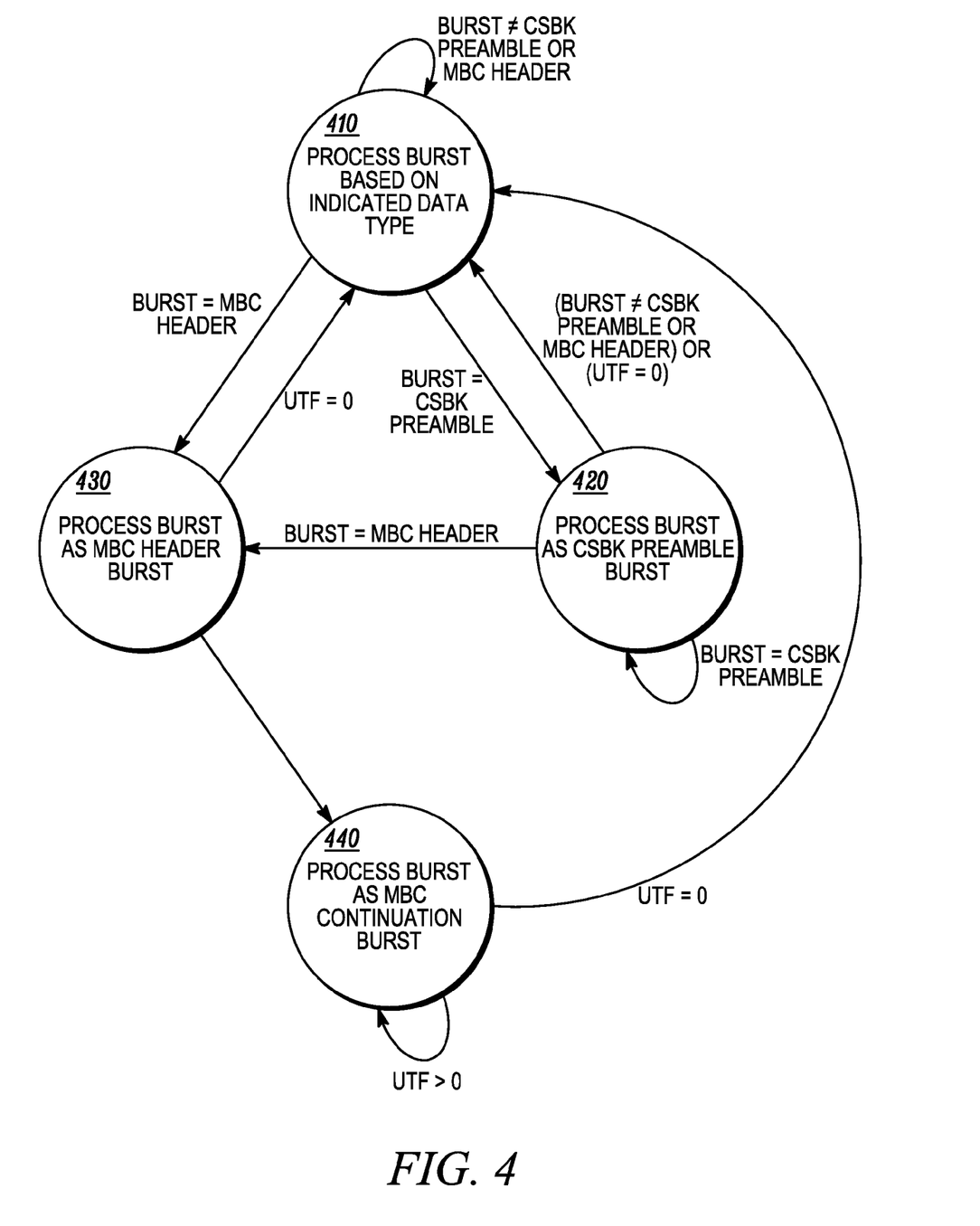
FIG. 4 shows one embodiment of a state diagram for receiving a multi-burst control message in accordance with the present disclosure.

One exemplary embodiment of a method for receiving the MBC message 300 in accordance with the present disclosure is shown in FIG. 4. For clarity, the method is illustrated as a state diagram, but it is of course understood that the method may also be exemplified using a flow chart or any other known methodology for illustrating a process.

When a receiving device (which may be a radio 102 or 104, a BS 108, or the like) begins receiving a communication stream comprising a plurality of TDMA bursts, the receiving device begins operation in state 410. In state 410, each received TDMA burst is processed normally based on the data type of the received TDMA burst. Thus, as each TDMA burst is received, the receiving device decodes the slot type field 220, and more particularly, the data type field 224, which indicates the type of information being transmitted in the information field 210 of the received burst. Upon determining the type of information being transmitted, the information field 210 is decoded, corrected, and/or repeated (if received by a BS 108) accordingly. The receiving device continues to operate in state 410 until a received burst is identified as either a CSBK preamble burst 310 or a MBC header burst 320.

If a received burst is identified as a CSBK preamble burst 310, the receiving device advances to state 420. In one embodiment, identifying that a received burst is a CSBK preamble burst 310 may include determining that the data type field 224 of the received burst indicates that the burst is a CSBK burst, determining that CSBKO (also referred to as "opcode") information provided within the information field 210 of the CSBK burst indicates that the CSBK burst is a CSBK preamble burst, and determining that the data type field 224 was successfully decoded. In one embodiment, determining that the data type field 224 was successfully decoded involves using the error detection contained in the information field 210 of the burst to perform error detection on the data type field 224. Methodology for performing error detection in this manner is described in ETSI TS 102 361, and is therefore not discussed in detail herein.

If, while in state 410, a received burst is identified as a MBC header burst 320, the receiving device advances to state 430. In one embodiment, identifying that a received burst is a MBC header burst 320 includes determining that the data type field 224 of the received burst indicates that the burst is a MBC header burst 320, and that the data type field 224 was successfully decoded.

In state 420, the receiving device processes received TDMA bursts as CSBK preamble bursts 310. Upon processing the first CSBK preamble burst 310 after advancing to state 420, the receiving device also determines a UTF value, indicating a number of data units (i.e., bursts) following the CSBK preamble burst 310 which are part of the message. In one exemplary embodiment, the UTF value may be obtained based on "Blocks to Follow" information that is provided within the information field 210 of the CSBK preamble burst 310, in accordance with the ETSI specification. It should also be understood that, for purposes of this disclosure, the first CSBK preamble burst processed in state 420 need not necessarily be the first CSBK preamble burst in the message. Thus, if a first CSBK preamble burst in a message is not properly identified as such, the receiving device may still advance to state 420 upon identifying a subsequent burst in the message as a CSBK preamble burst.

While in state 420, the receiving device continues to decode the data type field 224 of subsequently received TDMA bursts to identify their type. In the embodiment, as long as subsequent TDMA bursts are identified as CSBK preamble bursts 310, the receiving device continues operating in state 420, and the received TDMA bursts are processed as CSBK preamble bursts 310.

For each additional CSBK preamble burst 310 processed after the first, the UTF value is also decremented by one to indicate that there is one less TDMA burst remaining in the MBC message 300. Of course, alternatively, the UTF value may also be determined for each processed CSBK preamble burst 310 using the same method described above for the first received CSBK preamble burst (i.e., by referencing the UTF field of the CSBK preamble burst).

If, while in state 420, a received burst is identified as a MBC header burst 320, the receiving device advances to state 430. If a received burst cannot be identified as either a CSBK preamble burst 310 or a MBC header burst 320 (e.g., the data type field 224 does not indicate that the received burst is a CSBK burst or an MBC header burst, the opcode of a CSBK burst does not identify it as a CSBK preamble, or the data type field was not successfully decoded), or if the UTF value has reached zero, the receiving device returns to state 410.

Of course, it should be understood that subsequent TDMA bursts received in state 420 after the first CSBK preamble burst 310 can alternatively be forced to be processed as CSBK preamble bursts until either the UTF value reaches zero (in which case the receiving device returns to state 410) or a MBC header burst 320 is identified (in which case the receiving devices advances to state 430). In this way, if the data type of a subsequent burst is not properly decoded, the receiving device can continue to process receive bursts as CSBK preamble bursts rather than moving back to state 410.

In state 430, the received burst is processed as a MBC header burst 320. If the receiving device moved to state 430 from state 410, then the UTF value is also determined in state 430. Unlike the CSBK preamble burst 310, the MBC header burst 320 does not contain any "Blocks to Follow" information. Accordingly, in one embodiment, the UTF value may be implicitly determined based on the opcode information provided within the information field of the MBC header burst 320. As would be understood by one skilled in the art, the opcode information indicates the type of control information being transmitted in the MBC message. The number of bursts to follow the MBC header burst 320 may thus be extrapolated based on the type of control information being transmitted. For example, if the opcode information indicates that the MBC message is being used for a telephone interconnect message using up to 10 digits, the number of MBC continuation bursts following the MBC header burst is known to be one. On the other hand, if the opcode information indicates that the MBC message is being used for a telephone interconnect message using more than 10 digits, the number of MBC continuation bursts following the MBC header burst is known to be two.

If the receiving device moved to state 430 from state 420, the UTF value previously determined in state 420 is simply decremented by one upon processing the MBC header burst 320. Of course, alternatively, the opcode information may also be used to obtain a UTF value even if the receiving device entered state 430 from state 420.

If, after processing the MBC header burst 320, the UTF value is equal to zero, the receiving device returns back to state 410. However, if the UTF values are greater than zero after processing the MBC header burst 320, the receiving device advances to state 440.

In state 440, received TDMA bursts are processed as MBC continuation bursts 330 regardless of what data type is indicated in the data type field 224, or whether the data type field 224 was successfully decoded. With each TDMA burst processed in state 440, the UTF value is also decremented by one. The receiving device continues to operate in state 440 until the UTF value reaches zero, in which case, the receiving device returns to state 410. Thus, the present disclosure ensures that a number of received bursts (which is based on the UTF value) following a MBC header burst 320 are automatically processed as MBC continuation bursts 330 regardless of any errors that may occur in obtaining the data type.

The receiving device, while in state 440, may also be configured to process received bursts as MBC continuation bursts until a received burst is determined to be a last MBC continuation burst, for example, by reference to a last block field within the MBC continuation bursts. This method may be used to determine the end of the message (causing the receiver to return to state 410) instead of using the UTF value, or in conjunction with the UTF value to provide improved determination of the end of the message.

Figure 5:
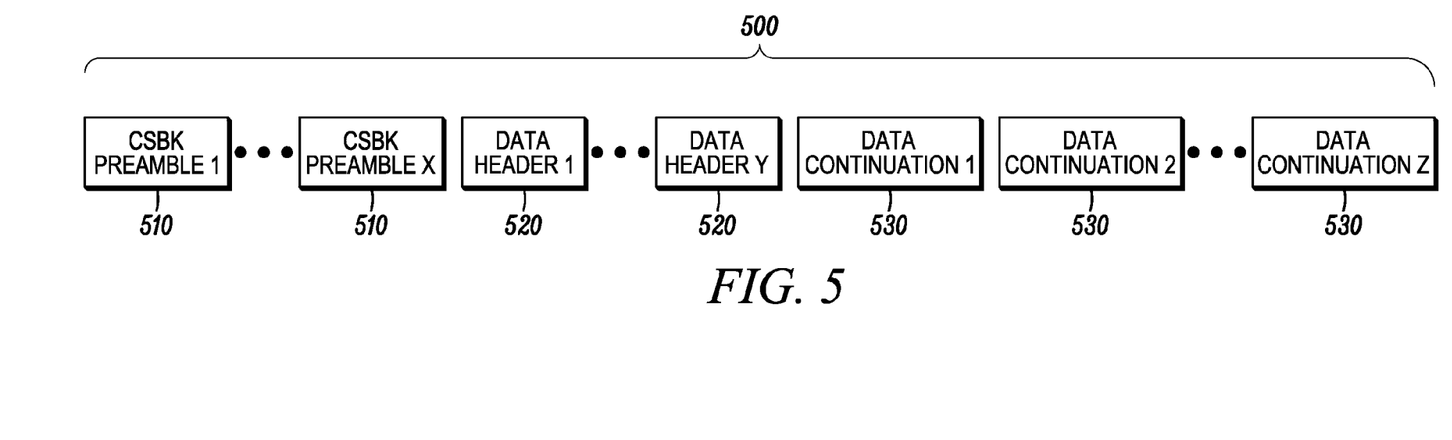
FIG. 5 shows one embodiment of a multi-burst data message in accordance with the present disclosure.

Another exemplary embodiment of a multi-burst message according to the ETSI specification is illustrated in FIG. 5. In this example, the multi-burst message 500 is a data message comprising a Y number of data headers 520 followed by a Z number of data continuation bursts 530, where Y and Z are each greater than or equal to one. As with the MBC message, the data message may also be preceded by an X number of CSBK preamble bursts 510, where X is greater than or equal to zero. However, unlike a MBC message where the MBC header can only be followed by one type of burst (i.e., MBC continuation burst), data headers 520 may be followed by more than one type of burst. For example, in accordance with the ETSI specification, a data header 520 may be followed by rate ¾ data continuation bursts, rate ½ data continuation bursts, or additional data headers. It should be noted, however, that when the data header is followed by a data continuation burst, the remainder of the message continues to use the same type of data continuation burst.

Figure 6:
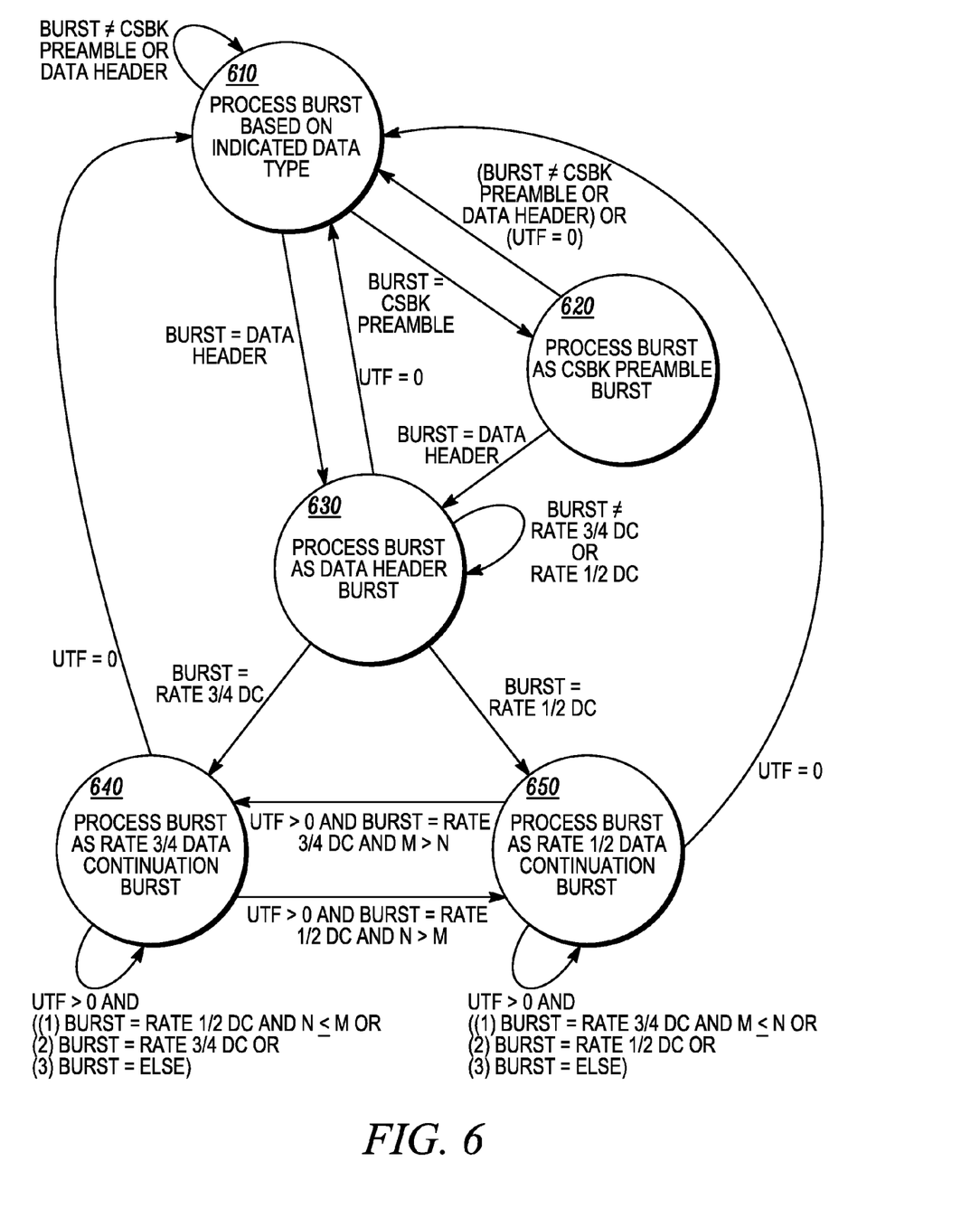
FIG. 6 shows one embodiment of a state diagram for receiving a multi-burst data message in accordance with the present disclosure.

One exemplary embodiment for receiving a multi-burst data message 500 in accordance with the present invention is illustrated in FIG. 6. In this embodiment, it is assumed that the data continuation bursts in the multi-burst message are either rate ¾ data continuation bursts or rate ½ data continuation bursts, as described in the ETSI specification. However, one skilled in the art would understand that multi-burst data messages can also be configured to allow for additional types of data continuation bursts (e.g., rate ½ data continuation bursts, or the like).

Similar to the process described above in FIG. 4, a receiving device begins receiving a communication stream comprising a plurality of TDMA bursts in state 610. In state 610, each received TDMA burst is processed normally based on the data type of the received TDMA burst. The receiving device continues to operate in state 610 until a received burst is identified as either a CSBK preamble burst 510 or a data header burst 520.

If, while in state 610, a received burst is identified as a CSBK preamble burst 510, the receiving device advances to state 620. If a received burst is identified as a data header burst 520, the receiving device advances to state 630. In one embodiment, identifying that a received burst is a data header burst 520 includes determining that the data type field 224 of the received burst indicates that the burst is a data header burst 520, and that the data type field 224 was successfully decoded.

In state 620, the receiving device processes received TDMA bursts as CSBK preamble bursts 510. Upon processing the first CSBK preamble burst 510 after advancing to state 620, the receiving device also determines a UTF value, indicating a number of data units comprising the multi-burst data message 500 excluding the current CSBK preamble burst. As noted above for FIG. 4, the first CSBK preamble burst processed state 620 need not necessarily be the first CSBK preamble burst of the multi-burst data message. While in state 620, the receiving device continues to decode the data type field 224 of subsequently received TDMA bursts to identify their type.

As long as subsequent TDMA bursts are identified as CSBK preamble bursts, the receiving device continues operating in state 620, and the received TDMA bursts are processed as CSBK preamble bursts 510. As in the embodiment described in FIG. 4, for each additional CSBK preamble burst 510 processed after the first, the UTF value is either decremented by one to indicate that there is one less TDMA burst remaining in the multi-burst data message or determined by referencing the UTF information in the CSBK preamble burst 510.

If, while in state 620, a received burst is identified as a data header burst 520, the receiving device advances to state 630. If the UTF value reaches zero, a received burst cannot be identified as either a CSBK preamble burst 510 or a data header burst 520, or if the received burst is not successfully decoded, the receiving device returns to state 610. Although, as discussed above for FIG. 4, the receiving device, while in state 620, may alternatively be configured to force subsequent TDMA bursts received after the first CSBK preamble burst 310 to be processed as CSBK preamble bursts until either the UTF value reaches zero (in which case the receiving device returns to state 610) or a data header burst 520 is received (in which case the receiving devices advances to state 630).

In state 630, the received TDMA bursts are processed as data header bursts 520. Upon processing the first data header burst after advancing to state 630, the receiving device also determines a UTF value. For example, if the receiving device moved to state 630 from state 610, then the UTF value may be determined in a similar fashion as used above for the CSBK preamble bursts 510. That is, by referencing UTF information that is provided within the information field 210 of the first data header burst 520. However, if the receiving device moved to state 630 from state 620, the UTF value may be determined either based on the UTF field or alternatively, by simply decrementing by one the UTF value previously determined in state 420. Upon entering state 630, two values, N and M, are also both set to 0.

While in state 630, the receiving device decodes the data type field 214 of the subsequently received TDMA bursts to determine their type, and continues to operate in state 630 until it is determined that there are no data header bursts 520 to be received. For example, in one embodiment, it may be determined that there are no more data header bursts 520 to be received if the data type field of a received burst indicates that a received TDMA burst is either a rate ¾ data continuation burst or a rate ½ data continuation burst. In another embodiment, a SAP value contained in the data header bursts 520 may be used to determine if that there are no more data header bursts 520 to be received. For example, the ETSI specification currently defines a number of SAP values, including "Unified Data Transport", "TCP/IP Header Compression", "UDP/IP Header Compression", "IP Based Packet Data", "Address Resolution Protocol", "Proprietary Packet Data", and "Short Data". If a SAP value other than for "Proprietary Packet Data" is detected, it can then be known that a subsequent received burst would be a data continuation burst. Of course, if multi-burst data messages are limited to a certain number of data header bursts 520, it may also be determined that there are no more data header bursts 520 to be received once that certain number of data header bursts 520 have been processed. With each TDMA burst processed as a data header burst in state 630, the UTF value is also decremented by one. If the UTF value reaches zero while the receiving device is operating in state 630, the receiving device returns to step 610.

If, while in state 630, the data type field of a received TDMA burst indicates that it is a rate ¾ data continuation burst, the receiving device advances to state 640 and the value M is incremented by one. If the data type field of a received TDMA burst indicates that it is a rate ½ data continuation burst, the receiving device advances to state 650 and the value N is incremented by one.

In state 640, received TDMA bursts are processed as rate ¾ data continuation bursts, and for each processed burst, the UTF value is decremented by one. For each TDMA burst received while in state 640, the receiving device also continues to identify the type of TDMA burst being indicated in the data type field. If a received TDMA burst is identified as a rate ¾ data continuation burst, the value M is incremented by one. If a received TDMA burst is identified as a rate ½ data continuation burst, the value N is incremented by one.

The values M and N, in conjunction with the data type field 224, are then used to determine how the received TDMA burst should be processed and which state the receiving device should operate in. For example, in one embodiment, if (1) the data type field 224 of the received burst indicates that the TDMA burst is a rate ¾ data continuation burst, (2) the data type field 224 of the received burst indicates that the TDMA burst is a rate ½ data continuation burst and N is less than or equal to M, or (3) the data type field 224 indicates that the TDMA burst is any type other than a rate ¾ data continuation burst or rate ½ data continuation burst, the receiving device continues to operate in state 640 and process the received TDMA burst as a rate ¾ data continuation burst. However, if the data type field 224 of the received burst indicates that the TDMA burst is a rate ½ data continuation burst and N is greater than M, then the receiving device moves to state 650.

State 650 is similar to state 640, except that in state 650, received TDMA bursts are processed as rate ½ data continuation bursts. As with state 640, for each TDMA burst process in state 650, the UTF value is decremented by one. For each TDMA burst received while in state 650, the receiving device also continues to identify the type of TDMA burst being indicated in the data type field. If a received TDMA burst is identified as a rate ¾ data continuation burst, the value M is incremented by one. If a received TDMA burst is identified as a rate ½ data continuation burst, the value N is incremented by one.

For each received burst the values N and M, along with the data type field 224, are then used to determine how the received burst should be processed. In one embodiment, if (1) the data type field 224 of the received burst indicates that the TDMA burst is a rate ½ data continuation burst, (2) the data type field 224 of the received burst indicates that the TDMA burst is a rate ¾ data continuation burst and M is less than or equal to N, or (3) the data type field 224 indicates that the TDMA burst is any type other than a rate ¾ data continuation burst or rate ½ data continuation burst, the receiving device continues to operate in state 650 and process the received TDMA burst as a rate ½ data continuation burst. However, if the data type field 224 of the received burst indicates that the TDMA burst is a rate ¾ data continuation burst and M is greater than N, then the receiving device moves to state 640.

The receiving device continues to process TDMA bursts as either rate ¾ data continuation bursts in state 640 or rate ½ data continuation bursts in state 650 until the UTF value reaches 0, at which time the receiving device returns to state 610.

Of course, while one embodiment is described, it is understood that other criteria may also be used to determine when and whether to switch between state 640 and state 650. For example, in one embodiment, the receiving device may be configured to move from state 640 to state 650 only if the data type field 224 of the received burst indicates that the TDMA burst is a rate ½ data continuation burst and N is greater than M. The receiving device may also be configured to only move if N is greater than M by a predetermined amount. Hysteresis routines may also be applied to limit or delay the switching between state 640 and state 650. If one of rate ½ data continuation bursts or rate ¾ data continuation bursts is more prevalent in a system, different criteria may also be applied for each of state 640 and state 650 to increase the chances of the data bursts being processed as one type over the other.

By means of the aforementioned disclosure, once the beginning of a multi-burst message has been identified, subsequently received data units for the message are forced to be decoded as a data unit of a type acceptable for that message. As a result, messages comprising multiple data bursts can be properly decoded and processed even if the data type field for one or more of the data bursts is incorrectly identified. Of course, those skilled in the art will realize that the above recognized advantages and other advantages described herein are merely exemplary and are not meant to be a complete rendering of all of the advantages of the various embodiments of the present invention.

Further advantages and modifications of the above described system and method will readily occur to those skilled in the art. For example, although exemplary data units have been described for a TDMA system in accordance with the ETSI specification, it is understood that the present disclosure may also apply to other types of systems using any other air interface protocol. The present disclosure is also described in relation to two exemplary currently defined message structures, which may be altered or updated in the future. Thus, while the above examples show headers, MBC messages comprising a MBC header followed by one type of data unit (e.g., MBC continuation) and data messages comprising data headers that may be followed by two different types of data units (e.g., rate ¾ data continuation or rate ½ data continuation), it is understood that the present disclosure may also be used to process data or control messages in which the header(s) (MBC header, data header, or otherwise) may be followed by more than two types of data units.

The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents.

What is claimed is:

1. A method for reliably decoding a message having a plurality of data units, at a receiving device, the message including a first portion followed by a second portion, the first portion having data units of a first type and the second portion having data units of a second type, the method comprising:
   receiving a first data unit;
   identifying the first data unit as being of the first type;
   processing the first data unit as a data unit of the first type;
   determining a number of units to follow in the message from information provided in the first type of data unit;
   processing subsequent received data units as data units of the first type until it is determined that the first portion of the message is complete; and
   upon determining that the first portion of the message is complete, processing a number of following data units as data units of the second type,
   wherein the number of following data units processed as data units of the second type is based on the determined number of units to follow;
   wherein determining the number of units to follow in the message includes at least one of (1) obtaining the number of units to follow from a "Blocks to Follow" field in the first data unit, (2) referencing opcode information in the first data unit to determine the type of information being provided in the message, and determining the number of unit to follow based on the type of information being provided, and (3) decrementing a previously determined "Units to Follow" value.

2. The method of claim 1 wherein the data unit of the first type is a multi-burst control (MBC) header burst and the data unit of the second type is a MBC continuation burst.

3. The method of claim 1 wherein processing the number of following data units as data units of the second type includes processing the number of following data units as data units of the second type regardless of the data type indicated by the following data units.

4. The method of claim 1 wherein processing the number of following data units as data units of the second type includes determining a data type indicated by a first one of the following data units, and processing a remaining number of following data units based on the data type indicated by the first one of the following data units.

5. The method of claim 1 wherein processing subsequent received data units as data units of the first type includes processing subsequent received data units as data units of the first type regardless of a data type indicated by each of the subsequent received data units.

6. The method of claim 1 wherein determining that the first portion of the message is complete includes one of (a) determining that a predetermined number of data units of a first type have been processed and (b) identifying a received data unit as a data unit of the second type.

7. The method of claim 6 wherein a received data unit is identified as a data unit of the second type if a Data Type field of the received data unit indicates that the data unit is of the second type.

8. A method for reliably decoding a message having a plurality of data units, at a receiving device, the message including a first portion followed by a second portion, which is followed by a third portion, the first portion having data units of a first type, the second portion having data units of a second type, and the third portion having data units of a third type, the method comprising:
   receiving a first data unit;
   identifying the first data unit as being of the first type;
   processing the first data unit as a data unit of the first type;
   determining a number of units to follow in the message from information provided in the first type of data unit;
   processing subsequent received data units as data units of the first type until a received data unit is identified as a data unit of the second type;
   processing a number of subsequent received data units as data units of the second type until it is determined that the second portion of the message is complete; and
   upon determining that the second portion of the message is complete, processing a number of following data units as data units of the third type,
   wherein the number of following data units processed as data units of the third type is based on the determined number of units to follow;
   wherein processing the number of following data units as data units of the third type includes determining a data type indicated by a first one of the following data units, and processing the remaining number of following data units based on the data type indicated by the first one of the following data units.

9. The method of claim 8 wherein the data unit of the first type is a CSBK Preamble burst, the data unit of the second type is a multi-burst control (MBC) header burst and the data unit of the third type is a MBC continuation burst.

10. The method of claim 8 wherein processing the number of following data units as data units of the third type includes processing the number of following data units as data units of the third type regardless of the data type indicated by the following data units.

11. The method of claim 8 wherein the data unit of the first type is a CSBK Preamble burst and identifying the first data unit as being of the first type includes decoding a Data Type field in the first data unit, determining that the Data Type field indicates that the first data unit is a CSBK Burst, determining that an opcode field in the CSBK burst indicates that the CSBK burst is a CSBK Preamble burst, and determining that the Data Type Field was successfully decoded.

12. The method of claim 8 wherein processing the number of subsequent received data units as data units of the second type includes processing the number of subsequent received data units as data units of the second type regardless of a data type indicated by each received data unit.

13. A method for reliably decoding a message having a plurality of data units, at a receiving device, the message including a first portion followed by a second portion, the first portion having data units of a first type and the second portion having data units of a second type or a third type, the method comprising: receiving a first data unit; identifying the first data unit as being of the first type; processing the first data unit as a data unit of the first type;

determining a number of unit to follow in the message from information provided in the first type of data unit;

processing subsequent received data units as data units of the first type until it is determined that the first portion of the message is complete;

upon determining that the first portion of the message is complete, processing a number of following data units as data units of the second type or the third type, wherein the number of following data units processed as data units of the second type or the third type is based on the determined number of units to follow;

wherein it is determined that the first portion of the message is complete if a received unit is identified as a data unit of the second type or the third type.

14. The method of claim 13 wherein the data units of the first type are data header bursts, the data units of the second type are rate ¾ data continuation bursts, and the data units of the third type are rate ½ data continuation bursts.

15. The method of claim 13 wherein processing a number of subsequent received data units as data units of the second type or the third type comprises, for each received data unit:

determining a M number of data units previously identified as a data unit of the second type;

determining a N number of data units previously identified as a data unit of the third type; determining the data type of the received data unit; and processing a received data unit based on the data type of the received data unit and the relationship between the values of M and N.

16. The method of claim 15 wherein processing the received data unit based on the data type of the received data unit and the relationship between the values of M and N includes:

processing the received data unit as a data unit of the second type if the received data unit is identified as a data unit of the second type and if M is equal to or greater than N by a predetermined amount; and processing the received data unit as a data unit of the third type if the received data unit is identified as a data unit of the third type and if N is equal to or greater than M by a predetermined amount.

17. The method of claim 16 wherein processing the received data unit further comprises:

if the received data unit is not identified as either a data unit of the second type or the third type, processing the received data unit as a same data type as an immediately preceding data unit.

18. A method for reliably decoding a message having a plurality of data units, at the receiving device, the message including a first portion followed by a second portion that is followed by a third portion, the first portion having data units of a first type, the second portion having data units of a second type, and the third portion having data units of a third type or a fourth type, the method comprising:

receiving a first data unit; identifying the first data unit as being of the first type;

processing the first data unit as a data unit of the first type;

determining a number of units to follow in the message from information provided in the first type of data unit;

processing subsequent received data units as data units of the first type until a received data unit is identified as a data unit of the second type;

processing a number of subsequent received data units as data units of the second type until it is determined that the second portion of the message is complete; and upon determining that the second portion of the message is complete, processing a number of following data units as data units of the third type or the fourth type, wherein the number of following data units processed as data units of the third type or the fourth type is based on the determined number of units to follow;

wherein processing the number of subsequent received data units as data units of the second type includes processing the number of subsequent received data units as data units of the second type regardless of a data type indicated by each received data unit.

19. The method of claim 18 wherein the data units of the first type are CSBK preamble bursts, the data units of the second type are data header bursts, the data units of the third type are rate ¾ data continuation bursts, and the data units of the fourth type are rate ½ data continuation bursts.

20. The method of claim 19 wherein identifying the first data unit as being of the first type includes decoding a Data Type field in the first data unit, determining that the Data Type field indicates that the first data unit is a CSBK Burst, determining that an opcode field in the CSBK burst indicates that the CSBK burst is a CSBK Preamble burst, and determining that the Data Type Field was successfully decoded.

21. The method of claim 18 wherein it is determined that the second portion of the message is complete if a received unit is identified as a data unit of the third type or the fourth type.

22. The method of claim 18 wherein processing a number of subsequent received data units as data units of the third type or the fourth type comprises, for each received data unit:

determining a M number of data units previously identified as a data unit of the third type; determining a N number of data units previously identified as a data unit of the fourth type;

determining the data type of the received data unit; and processing a received data unit based on the data type of the received data unit and the relationship between the values of M and N.

23. The method of claim 22 wherein processing the received data unit based on the data type of the received data unit and the relationship between the values of M and N includes:

processing the received data unit as a data unit of the third type if the received data unit is identified as a data unit of the third type and if M is equal to or greater than N by a predetermined amount; and processing the received data unit as a data unit of the fourth type if the received data unit is identified as a data unit of the fourth type and if N is equal to or greater than M by a predetermined amount.

24. The method of claim 23 wherein processing the received data unit further comprises:

if the received data unit is not identified as either a data unit of the third type or the fourth type, processing the received data unit as a same data type as an immediately preceding data unit.

* * * * *

UNITED STATES PATENT AND TRADEMARK OFFICE
CERTIFICATE OF CORRECTION

PATENT NO.         : 8,102,857 B2                                  Page 1 of 1
APPLICATION NO.    : 11/670514
DATED              : January 24, 2012
INVENTOR(S)        : Wiatrowski et al.

It is certified that error appears in the above-identified patent and that said Letters Patent is hereby corrected as shown below:

In Column 4, Line 16, delete "1 10." and insert -- 110. --, therefor.

Signed and Sealed this
Eighteenth Day of December, 2012

David J. Kappos
*Director of the United States Patent and Trademark Office*